United States Patent
Takemoto et al.

(10) Patent No.: US 11,572,632 B2
(45) Date of Patent: Feb. 7, 2023

(54) METHOD FOR MANUFACTURING HIGH PURITY TIN, ELECTROWINNING APPARATUS FOR HIGH PURITY TIN AND HIGH PURITY TIN

(71) Applicant: JX Nippon Mining & Metals Corporation, Tokyo (JP)

(72) Inventors: Kouichi Takemoto, Ibaraki (JP); Toru Imori, Ibaraki (JP); Takashi Ouchi, Ibaraki (JP); Hirofumi Takahashi, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 567 days.

(21) Appl. No.: 16/674,676

(22) Filed: Nov. 5, 2019

(65) Prior Publication Data

US 2020/0071842 A1    Mar. 5, 2020

Related U.S. Application Data

(62) Division of application No. 14/872,316, filed on Oct. 1, 2015, now abandoned.

(51) Int. Cl.
| | |
|---|---|
| C25C 1/14 | (2006.01) |
| C25C 7/06 | (2006.01) |
| C22C 13/00 | (2006.01) |

(52) U.S. Cl.
CPC ............. *C25C 1/14* (2013.01); *C22C 13/00* (2013.01); *C25C 7/06* (2013.01)

(58) Field of Classification Search
CPC ..................................................... C25C 1/14
See application file for complete search history.

(56) References Cited

U.S. PATENT DOCUMENTS

| | | | | |
|---|---|---|---|---|
| 2,319,887 A | * | 5/1943 | Stack | ........................ C25C 1/14 |
| | | | | 205/614 |
| 6,372,117 B1 | * | 4/2002 | Tamura | .................... C25D 3/58 |
| | | | | 205/241 |

(Continued)

FOREIGN PATENT DOCUMENTS

| | | |
|---|---|---|
| CN | 1837413 A | 9/2006 |
| CN | 101033557 A | 9/2007 |

(Continued)

OTHER PUBLICATIONS

Higashiguchi, T., "Progress in Extreme Ultraviolet (EUV) Source Development", J Plasma Fusion Res., vol. 89, No. 6, 341-348 (2013).

*Primary Examiner* — Anthony J Zimmer
*Assistant Examiner* — Jacob J Gusewelle
(74) *Attorney, Agent, or Firm* — Faegre Drinker Biddle & Reath LLP

(57) ABSTRACT

Provided is a method for manufacturing high purity tin including: depositing electrodeposited tin on the surface of a cathode by electrowinning in an electrolytic bath in which a diaphragm is placed between an anode and the cathode, by using a raw material for tin as the anode and a leachate obtained by electrolytically leaching the raw material for tin in a sulfuric acid solution as an electrolytic solution, the electrolytic solution containing a smoothing agent for improving a surface property of the electrodeposited tin; discharging the electrolytic solution from the electrolytic bath such that lead in the discharged electrolytic solution is removed; and putting the electrolytic solution from which lead is removed back into the electrolytic bath.

10 Claims, 3 Drawing Sheets

(56) References Cited

U.S. PATENT DOCUMENTS

| | | | |
|---|---|---|---|
| 2009/0098012 A1 | 4/2009 | Shindo et al. | |
| 2012/0195822 A1 | 8/2012 | Werner et al. | |
| 2013/0028786 A1 | 1/2013 | Kanou | |
| 2013/0341196 A1* | 12/2013 | Silinger | ................... C25C 1/14 205/99 |

FOREIGN PATENT DOCUMENTS

| | | |
|---|---|---|
| JP | S621478 B2 | 1/1987 |
| JP | 01283398 A | 11/1989 |
| JP | 02228487 A | 9/1990 |
| JP | 02754030 B2 | 5/1998 |
| JP | 11343590 B2 | 12/1999 |
| JP | 3882608 B2 | 2/2007 |
| JP | 5296269 B1 | 6/2013 |
| JP | 2014506554 A | 3/2014 |
| TW | 201410921 A | 3/2014 |
| WO | 2011114824 A1 | 9/2011 |

* cited by examiner

Fig. 2

| Element | Raw Material | Example 1 | Example 2 | Example 3 | Example 4 | Example 5 | Comp. Example 1 |
|---|---|---|---|---|---|---|---|
| Na | < 0.01 | < 0.01 | < 0.01 | < 0.01 | < 0.01 | < 0.01 | < 0.01 |
| Mg | < 0.01 | < 0.01 | < 0.01 | < 0.01 | < 0.01 | < 0.01 | < 0.01 |
| Al | < 0.01 | < 0.01 | < 0.01 | < 0.01 | < 0.01 | < 0.01 | < 0.01 |
| Si | < 0.01 | < 0.01 | < 0.01 | < 0.01 | < 0.01 | < 0.01 | < 0.01 |
| P | < 0.01 | < 0.01 | < 0.01 | < 0.01 | < 0.01 | < 0.01 | 0.15 |
| S | 4 | 0.12 | 0.38 | 0.28 | 0.17 | 0.20 | 1.5 |
| K | < 0.01 | < 0.01 | < 0.01 | < 0.01 | < 0.01 | < 0.01 | < 0.01 |
| Ti | < 0.005 | < 0.005 | < 0.005 | < 0.005 | < 0.005 | < 0.005 | < 0.005 |
| Cr | < 0.005 | < 0.005 | < 0.005 | < 0.005 | < 0.005 | < 0.005 | < 0.005 |
| Mn | < 0.005 | < 0.005 | < 0.005 | < 0.005 | < 0.005 | < 0.005 | < 0.005 |
| Fe | 0.51 | 0.03 | 0.01 | 0.02 | 0.02 | 0.02 | < 0.005 |
| Co | < 0.01 | < 0.01 | < 0.01 | < 0.01 | < 0.01 | < 0.01 | < 0.01 |
| Ni | < 0.01 | < 0.01 | < 0.01 | < 0.01 | < 0.01 | < 0.01 | < 0.01 |
| Cu | 0.03 | 0.06 | < 0.01 | 0.02 | < 0.01 | 0.05 | 0.1 |
| Zn | < 0.01 | < 0.01 | < 0.01 | < 0.01 | < 0.01 | < 0.01 | < 0.01 |
| Ge | < 0.01 | < 0.01 | < 0.01 | < 0.01 | < 0.01 | < 0.01 | < 0.01 |
| As | 0.01 | < 0.005 | < 0.005 | < 0.005 | < 0.005 | < 0.005 | 0.05 |
| Sr | < 0.005 | < 0.005 | < 0.005 | < 0.005 | < 0.005 | < 0.005 | < 0.005 |
| Mo | < 0.01 | < 0.01 | < 0.01 | < 0.01 | < 0.01 | < 0.01 | < 0.01 |
| Ru | < 0.01 | < 0.01 | < 0.01 | < 0.01 | < 0.01 | < 0.01 | < 0.01 |
| Ag | 0.13 | < 0.01 | < 0.01 | < 0.01 | < 0.01 | 0.05 | 0.09 |
| Cd | < 0.05 | < 0.05 | < 0.05 | < 0.05 | < 0.05 | < 0.05 | < 0.05 |
| In | < 1 | < 1 | < 1 | < 1 | < 1 | < 1 | < 1 |
| Sn | Matrix | Matrix | Matrix | Matrix | Matrix | Matrix | Matrix |
| Sb | 0.93 | < 0.5 | < 0.5 | < 0.5 | < 0.5 | < 0.5 | < 0.5 |
| Te | < 0.1 | < 0.1 | < 0.1 | < 0.1 | < 0.1 | < 0.1 | < 0.1 |
| W | < 0.01 | < 0.01 | < 0.01 | < 0.01 | < 0.01 | < 0.01 | < 0.01 |
| Au | < 0.05 | < 0.05 | < 0.05 | < 0.05 | < 0.05 | < 0.05 | < 0.05 |
| Pb | 2.8 | < 0.01 | < 0.01 | < 0.01 | < 0.01 | < 0.01 | 1.5 |
| Bi | < 0.01 | < 0.01 | < 0.01 | < 0.01 | < 0.01 | < 0.01 | 0.06 |
| Th | < 0.005 | < 0.005 | < 0.005 | < 0.005 | < 0.005 | < 0.005 | < 0.005 |
| U | < 0.005 | < 0.005 | < 0.005 | < 0.005 | < 0.005 | < 0.005 | < 0.005 |

| Element | Comp. Example 2 | Comp. Example 3 | Comp. Example 4 | Example 1 | Example 2 | Example 3 | Example 4 | Example 5 |
|---|---|---|---|---|---|---|---|---|
| S | 5 | 19 | 19 | 0.12 | 0.38 | 0.28 | 0.17 | 0.20 |
| Cu | 0.012 | 0.3 | 1.2 | 0.06 | < 0.01 | 0.02 | < 0.01 | 0.05 |
| Sb | 0.8 | 6 | 3 | < 0.5 | < 0.5 | < 0.5 | < 0.5 | < 0.5 |
| Pb | 0.64 | 0.1 | 0.35 | < 0.01 | < 0.01 | < 0.01 | < 0.01 | < 0.01 |

(a) Needle-shaped electrodeposited tin     (b) Plate-shaped electrodeposited tin

METHOD FOR MANUFACTURING HIGH PURITY TIN, ELECTROWINNING APPARATUS FOR HIGH PURITY TIN AND HIGH PURITY TIN

TECHNICAL FIELD

The present invention relates to a method for manufacturing high purity tin, an electrowinning apparatus for high purity tin and high purity tin. More specifically, the present invention relates to a method for manufacturing high purity tin which is capable of manufacturing a plate electrodeposited entity with a low concentration of sulfur and a low concentration of antimony, and is capable of manufacturing high purity tin from the plate electrodeposited entity, and an electrowinning apparatus for high purity tin as well as high purity tin.

BACKGROUND ART

Tin has been widely used for manufacturing electronic parts. For example, tin is used for solder materials used for bonding a semiconductor chip and a substrate, bump forming materials used during TAB (tape automated bonding) or during mounting flip chips and semiconductor wiring materials and the like. Since recent semiconductor devices are highly densified and highly integrated, there is a considerable risk that a soft error may be caused by $\alpha$ rays emitted from materials in the vicinity of bonded semiconductor chips, and therefore, there are demands for technologies capable of obtaining high purity tin with a decreased emission of $\alpha$ rays.

For example, Patent Literature 1 discloses a method for electrowinning tin which comprises: extracting an electrolytic solution for tin consisting of a mixed acid of sulfuric acid and fluorosilicic acid from an electrolytic bath, sending it to a setting tank, adding strontium carbonate in the setting tank to the electrolytic solution, precipitating lead in the solution, filtrating the electrolytic solution containing a precipitate such that the precipitate is separated by filtration, and returning the electrolytic solution from which the precipitate has been removed to the electrolytic bath such that electrowinning is performed, as well as an electrowinning apparatus therefor.

However, the method for manufacturing high purity tin disclosed in Patent Literature 1 is expensive because the mixed acid of fluorosilicic acid and sulfuric acid is used as an electrolytic solution. Further, the method for manufacturing high purity tin disclosed in Patent Literature 1 is complicated because controlling the temperature of solution in the setting tank is essential. Furthermore, though Patent Literature 1 employs a method for diluting lead by mixing a refined electrolytic solution and an unrefined electrolytic solution, the apparatus for electrowinning disclosed in Patent Literature 1 does not have a diaphragm between an anode and a cathode, and therefore, there is a possibility that lead leached from the anode is always taken into the cathode. Accordingly, the purification effect of lead tends to be decreased, and as a whole, the method cannot be said to be of an expected level with regard to making high purity tin despite manufacturing being expensive.

Patent Literature 2 discloses a method for manufacturing metallic tin of 5N or higher which comprises: adding nitric acid to a heated aqueous solution to which crude metallic tin is added, precipitating metastannic acid and filtrating off the metastannic acid, dissolving the thus obtained metastannic acid in hydrochloric acid or hydrofluoric acid, and obtaining the dissolved liquid as an electrolytic solution. It is disclosed that this technology can vaguely be applied for use in a semiconductor. However, Patent Literature 2 features no mention of matters relating to the emission of $\alpha$ rays which causes a problem of a soft error in the semiconductor, and therefore, it can be said that Patent Literature 2 is of a low level of concern about the emission of $\alpha$ rays.

Patent Literature 3 discloses a method for manufacturing tin oxide having an $\alpha$ ray count of less than about 0.002 cph/cm2 which comprises: forming a suspension comprising a Sn-dicarboxylate complex from a Sn salt, washing the Sn-dicarboxylate complex to obtain a wash solution, and reacting the thus obtained washed Sn-dicarboxylate complex with a base to form tin oxide. However, Patent Literature 3 only discloses properties relating to the $\alpha$ ray count, but does not particularly disclose impurities such as lead in tin oxide.

Patent Literature 4 discloses examples of tin having a purity of 99.99% or higher and the number of counts of radioactive $\alpha$-particles of 0.03 cph/cm2 or less, which is manufactured by electrolysis using a guaranteed sulfuric acid reagent. Though it is natural that the use of a high purity raw material can produce a high purity material, as disclosed in Patent Literature 4, the lowest $\alpha$ ray count of the deposited tin shown in Examples of Patent Literature 4 is 0.03 cph/cm2, and therefore, Patent Literature 4 cannot achieve an expected level despite the method being expensive.

Patent Literature 5, similar to Patent Literature 4, discloses examples of a method for manufacturing tin, comprising: performing electrolysis by using an electrolytic solution containing sulfuric acid corresponding to sulfuric acid as a first-class reagent and hydrochloric acid corresponding to hydrochloric acid as a first-class reagent and by using tin with a purity of 99.97 wt % or higher as an anode. However, it cannot be said that Patent Literature 5 achieves an expected level of the $\alpha$ ray count of the deposited tin despite the method being expensive, either.

In view of the above, the applicant has studied high purity tin and methods for manufacturing the same as disclosed in Patent Literature 6 and 7. According to Patent Literature 6 and 7, high purity tin having contents of Pb and Bi which emit radioactive $\alpha$ particles of 1 ppm or less and having an $\alpha$ ray count of 0.001 cph/cm2 or less as well as methods for manufacturing the same can be provided.

However, in the manufacturing methods proposed in Patent Literatures 6 and 7, a smoothing agent for smoothing electrodeposited tin which is electrodeposited on the surface of a cathode has not been added in order to sufficiently secure the potential difference between tin and lead, and therefore, the electrodeposited tin which is electrodeposited on the surface of the cathode was needle-shaped. Accordingly, when recovering the electrodeposited tin from the cathode by pulling up the cathode from the electrolytic bath, the electrolytic solution being taken out due to needle-shaped electrodeposited tin tends to increase, and there have been cases where the manufacturing yield has been decreased in order to supplement a new electrolytic solution.

In addition, since electrodeposited tin is needle-shaped, the surface area of electrodeposited tin tends to be large, and when manufacturing an ingot of tin by casting electrodeposited tin in the air, there has been a case where oxidation tends to proceed easily. As a result, it has been necessary for casting to be performed in a reducing atmosphere such as hydrogen in order to obtain high purity tin, and there has been a case where the productivity cannot be improved sufficiently.

CITATION LIST

Patent Literature

[PTL 1] JP 3882608 B2
[PTL 2] JP 11-343590 A
[PTL 3] JP 2014-506554 A corresponding to WO 12/103396 A2
[PTL 4] JP 01-283398 A
[PTL 5] JP 02-228487 A
[PTL 6] JP 5296269 B1 corresponding to EP 1900853 A1
[PTL 7] WO 11/114824 A1 corresponding to EP 2548981 A1

SUMMARY OF INVENTION

Technical Problem

In view of the above-described problems, the present invention provides a method for manufacturing high purity tin which is capable of reducing the manufacturing cost, of improving the productivity of tin and of manufacturing tin materials with decreased α ray emission, and an electrowinning apparatus for high purity tin as well as high purity tin.

Solution to Problem

The present inventor studied intensively, and as a result found that, in electrowinning tin, plate shaped electrodeposited tin with decreased concentrations of impurities such as sulfur and antimony and with a relatively smooth surface property can be obtained on the surface of a cathode by discharging an electrolytic solution in an electrolytic bath, removing lead in the discharged electrolytic solution, and putting the electrolytic solution back into the electrolytic bath again circulatedly, as well as by making the electrolytic solution contain a smoothing agent. Further, the present inventor found that high purity tin with reduced emission of α rays can be obtained at low cost and with high productivity by melting casting the plate shaped electrodeposited tin in the air.

The present invention, which was completed based on the above-described findings, provides in one aspect, a method for manufacturing high purity tin, the method comprising: depositing electrodeposited tin on the surface of a cathode by electrowinning in an electrolytic bath in which a diaphragm is placed between an anode and the cathode, by using a raw material for tin as the anode and a leachate obtained by electrolytically leaching the raw material for tin in a sulfuric acid solution as an electrolytic solution, wherein the electrolytic solution contains a smoothing agent for improving a surface property of the electrodeposited tin; discharging the electrolytic solution from the electrolytic bath such that lead in the discharged electrolytic solution is removed; and putting the electrolytic solution from which lead is removed back into the electrolytic bath.

The method for manufacturing high purity tin according to the present invention, in one embodiment, comprises: discharging the electrolytic solution in an anode side chamber in the electrolytic bath in which the anode is placed; removing lead in the discharged electrolytic solution; and putting the electrolytic solution from which lead is removed back into a cathode side chamber in the electrolytic bath in which the cathode is placed.

In another embodiment of the method for manufacturing high purity tin according to the present invention, the smoothing agent comprises a nonionic surfactant which is a compound having an aryl group and one or more hydroxyl groups, the one or more hydroxyl groups being connected to the aryl group via methylene or a plurality of ethylene oxides.

In yet another embodiment of the method for manufacturing high purity tin according to the present invention, the smoothing agent comprises a polyoxyethylene alkyl phenyl ether.

The method for manufacturing high purity tin according to the present invention, in yet another embodiment, employs a raw material for tin with a purity of 4N (99.99%) or higher. The gas components of O, C, N and H are excluded in the purity.

In yet another embodiment of the method for manufacturing high purity tin according to the present invention, the content of lead in the raw material for tin is 20 ppm or less.

In yet another embodiment of the method for manufacturing high purity tin according to the present invention, an electrodeposited entity of high purity tin composed of a plate crystal is obtained. In this regard, "an electrodeposited entity of high purity tin composed of a plate crystal" used in the present invention means an electrodeposited entity in which high purity tin is electrodeposited as a series of plates in a direction parallel to the electrodeposition surface of the cathode plate and in which high purity tin is electrodeposited on the whole surface of the cathode plate, without cracks which would be observed in the case of needle-shaped growth being observed. In contrast, in the case of a conventional process, an electrodeposited entity composed of a needle-shaped crystal which growths in a narrow and long needle-like shape is obtained. This "electrodeposited entity composed of a needle-shaped crystal" includes tin which grows in a dendrite shape and that which is electrodeposited on the cathode plate in a network shape.

The present invention provides, in another aspect, an electrowinning apparatus for high purity tin, the apparatus comprising: an anode made of a raw material for tin, a cathode which is opposite to the anode, and a diaphragm placed between the anode and the cathode; an electrolytic bath for performing electrowinning by using an electrolytic solution which is a leachate obtained by electrolytically leaching the raw material for tin in a sulfuric acid solution to which a smoothing agent for improving a surface property of electrodeposited tin which is deposited on the cathode is added; a tank for solution purification which discharges the electrolytic solution from the electrolytic bath and removes lead in the discharged electrolytic solution; a filtration device which filtrates the electrolytic solution treated in the tank for solution purification; and a liquid supply line which supplies the filtrated electrolytic solution to the electrolytic bath.

The electrowinning apparatus for high purity tin according to the present invention, in one embodiment, comprises: discharging the electrolytic solution in an anode side chamber of the electrolytic bath in which the anode is placed; removing lead from the discharged electrolytic solution; and supplying the electrolytic solution from which lead is removed as an electrolytic solution in a cathode side chamber of the electrolytic bath in which the cathode is placed.

The present invention, in yet another aspect, provides high purity tin manufactured by the above-described method for manufacturing high purity tin, wherein the content of lead is less than 0.1 ppm, the content of sulfur is 1.0 ppm or less, and the α ray count is 0.001 cph/cm2 or less.

In one embodiment of the high purity tin according to the present invention, the content of lead is less than 0.05 ppm, the content of antimony is less than 0.5 ppm, the content of copper is less than 0.1 ppm, the content of sulfur is 0.5 ppm or less, and the α ray count is 0.001 cph/cm2 or less.

Advantageous Effects of Invention

According to the present invention, a method for manufacturing high purity tin which is capable of reducing the manufacturing cost, of improving the productivity of tin and of manufacturing highly pure tin materials with decreased α ray emission, and an electrowinning apparatus for high purity tin, as well as high purity tin can be provided.

BRIEF DESCRIPTION OF DRAWINGS

FIG. 2: A table which shows compositions of impurities in a raw material for tin as well as in high purity tin of Examples 1 to 5 and Comparative Example 1.

DESCRIPTION OF EMBODIMENTS

Electrowinning Apparatus

Figure 1:
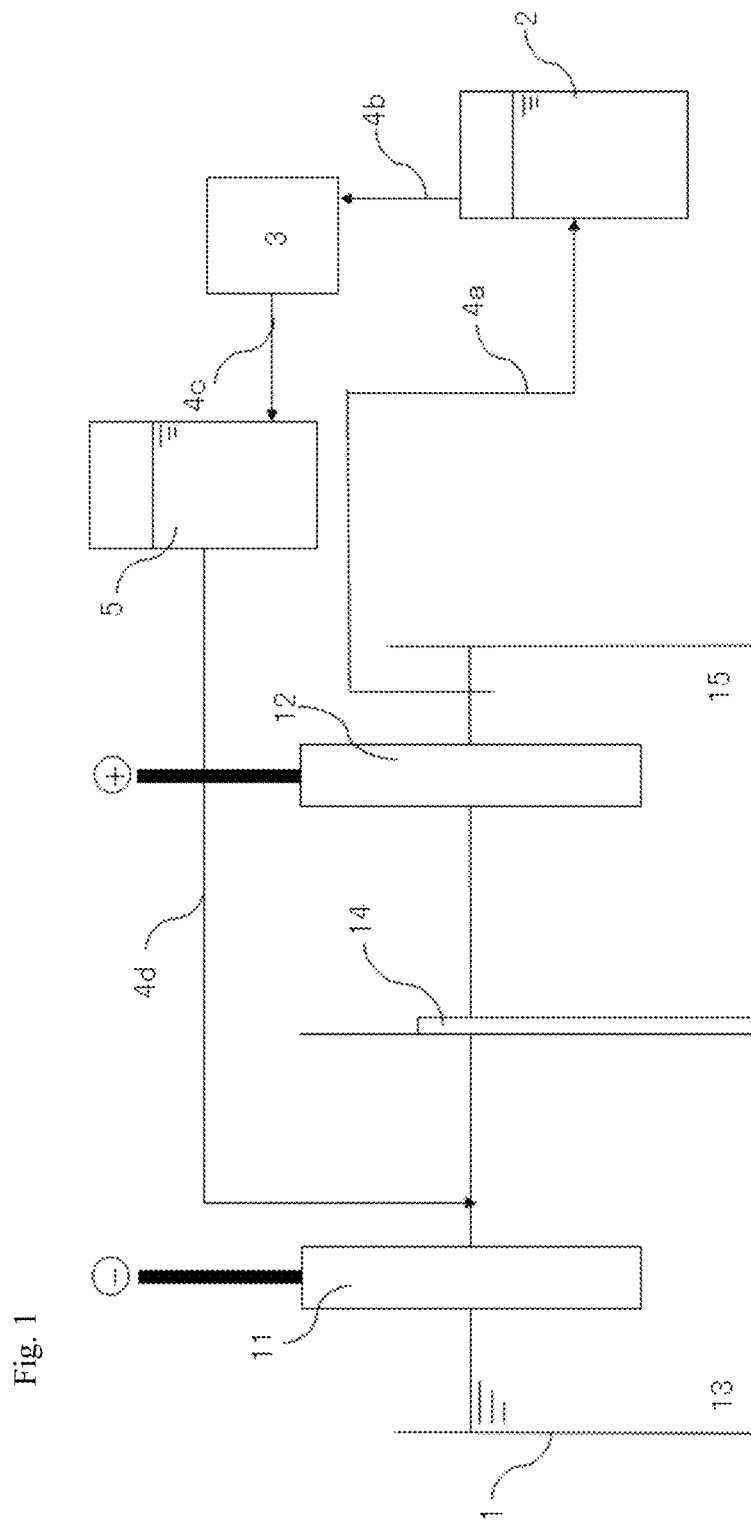
FIG. 1: A schematic diagram which shows an electrowinning apparatus for tin according to an embodiment of the present invention.

One example of an electrowinning apparatus according to an embodiment of the present invention is shown in FIG. 1. As shown in FIG. 1, the electrowinning apparatus has an electrolytic bath 1, a tank 2 for solution purification which discharges a part of an electrolytic solution in the electrolytic bath 1 and purifies the electrolytic solution, a filtration device 3 connected to the tank 2 for solution purification, a storage tank 5 which stores the purified electrolytic solution, and liquid supply lines 4a to 4d which supply the electrolytic solution.

In the electrolytic bath 1, a cathode 11 and an anode 12 are placed. The inside of the electrolytic bath 1 is partitioned into a cathode chamber 13 in which the cathode 11 is placed and an anode chamber 15 in which the anode 12 is placed, and a diaphragm 14 is placed between the cathode 11 and the anode 12 in order to prevent impurity ions generated from the anode 12 by electrowinning from depositing on the cathode 11. As the diaphragm 14, an ion exchange membrane is suitably used.

As the anode 12, a raw material for tin, preferably a raw material for tin with a purity of 4N or higher (provided that the purity excludes the gas components of O, C, N and H) (hereinafter also referred to as "a raw material for tin with the purity of 4N or higher"), which is made to be a predetermined shape by melting casting is used. The lower the content of lead in a raw material for tin, the more effectively electrowinning can be performed, and therefore, the content of lead in the raw material for tin is preferably 50 ppm or less, more preferably 20 ppm or less, even more preferably 10 ppm or less, and even more preferably 5 ppm or less. In addition, it is preferable to use a raw material for tin having a content of sulfur of 20 ppm or less, and preferably of 10 ppm or less, a content of iron of 10 ppm or less, and preferably of 1 ppm or less, a content of copper of 10 ppm or less, and preferably of 1 ppm or less, a content of antimony of 10 ppm or less, and preferably of 1 ppm or less, and a content of silver of 10 ppm or less, and preferably of 1 ppm. As the cathode 11, a metal plate such as a stainless steel plate and a titanium plate is used. As the electrolytic solution which is supplied to the electrolytic bath 1, a leachate obtained by electrolytically leaching the above-described raw material for tin, in other words, a raw material for tin with the purity of 4N or higher, preferably a raw material for tin having the content of lead of 20 ppm or less in a sulfuric acid solution, is suitably used.

To the electrolytic solution, a smoothing agent is added for improving a surface property of electrodeposited tin during electrolysis. As the smoothing agent, a nonionic surfactant which is a compound having an aryl group and one or more hydroxyl groups, the one or more hydroxyl groups being connected to the aryl group via methylene or a plurality of ethylene oxides, is used.

By using a compound having an aryl group and one or more hydroxyl groups as the smoothing agent, decomposition of the smoothing agent in electrowinning is suppressed compared to a compound without this structure, and therefore, the effect of the smoothing agent can be obtained stably for a long time period. In addition, when the smoothing agent is added in a conventional electrolytic refining process for high purity tin, it has been difficult to obtain high-purity electrodeposited tin with an excellent surface property because the smoothing agent makes the potential difference between Sn and Pb small. However, in the present invention, lead leached from the anode can be prevented from depositing directly on the cathode by placing the diaphragm between the anode and the cathode. Further, in the present invention, by removing lead ions accumulated in an anode side electrolytic solution, and supplying the electrolytic solution from which lead ions have been removed to the cathode as a cathode side electrolytic solution, the problem of the potential difference between Sn and Pb can be solved and the casting yield of the subsequent melting casting step can be improved, and high purity electrodeposited tin with an excellent surface property can be obtained.

As the smoothing agent, compounds represented by the following chemical formulae (1) to (4) can be used:

Chemical Formula 1

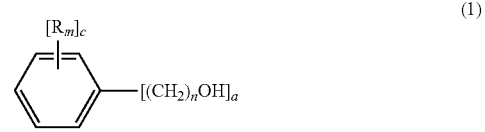

(1)

Chemical Formula 2

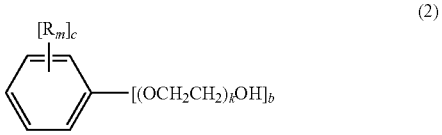

(2)

Chemical Formula 3

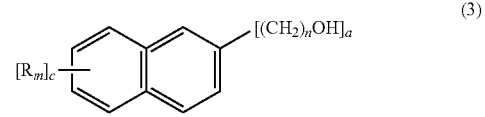

(3)

Chemical Formula 4

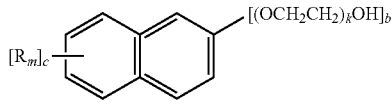

(4)

In the formulae (1) to (4), each of m and n represents an integer of 0 to 12, each of a, b and c represents an integer of 1 to 3 and k represents an integer of 4 to 24].

More preferably, one or more kinds selected from the group consisting of α-naphthol, β-naphthol, an EO (ethylene oxide) adduct of α-naphthol, an EO adduct of β-naphthol and a polyoxyethylene alkyl phenyl ether can be used as the smoothing agent. Among the above, β-naphthol and a polyoxyethylene nonyl phenyl ether are preferably used. In contrast, a chain compound having a hydroxyl group but without having an aryl group decomposes during electrolysis, and therefore, there are some cases where the chain compound is not suited for the embodiment in terms of lifetime and stability.

The content of the smoothing agent in the electrolytic solution is preferably 1 to 20 g/L and is more preferably 3 to 10 g/L. When the content of the smoothing agent is extremely low, it tends to be difficult to obtain an improving effect of a surface property of electrodeposited tin. Meanwhile, in addition to the smoothing agent, an antioxidant such as hydroquinone may be added to the electrolytic solution in an amount of about 1 to 10 g/L, more preferably 4 to 6 g/L. The smoothing agent can be added, for example, in a storage tank 5 which supplies the electrolytic solution circulatedly into a cathode box 13.

The tank 2 for solution purification accommodates the electrolytic solution discharged from the electrolytic bath 1 and removes lead in the discharged electrolytic solution. Examples of a method for removing lead include solvent extraction of lead ions by using an extracting agent, adsorption removal using an ion exchange resin and the like, salt precipitation of hardly soluble sulfide by adding sulfide, coprecipitation by adding a coprecipitating agent such as strontium ion, and the like. For example, when coprecipitation by using strontium is performed, the tank 2 for solution purification is equipped with a stirring means which is not shown in figures, and a coprecipitating agent such as strontium carbonate is added under stirring, which gives a precipitate of strontium sulphate ($SrSO_4$) containing lead in the electrolytic solution. The added amount of the coprecipitating agent is preferably 1 to 30 g/L, more preferably 3 to 20 g/L, and even more preferably 3 to 10 g/L.

The electrolytic solution discharged from the tank 2 for solution purification is supplied to a filtration device 3 such as a filter press through a liquid supply line 4b and is subjected to solid-liquid separation. This removes impurities in the electrolytic solution. In other words, when the coprecipitating agent such as strontium carbonate is used to give a precipitate in the electrolytic solution in the tank 2 for solution purification, lead-containing strontium sulphate which is contained in the electrolytic solution is removed. The filtrate obtained by the solid-liquid separation is supplied as a purified electrolytic solution through a liquid supply line 4c to the storage tank 5, and is supplied to the cathode chamber 13 of the electrolytic bath 1 through a liquid supply line 4d to be circulatedly used. The liquid supply lines 4a to 4d are liquid supply lines which discharge the electrolytic solution in the electrolytic bath 1 to be refined/purified, and which put the purified electrolytic solution back into the electrolytic bath 1 again.

Meanwhile, the liquid supply line 4d is connected to the cathode chamber 13 of the electrolytic bath 1, and supplies the electrolytic solution from which lead has been removed to the cathode chamber 13 of the electrolytic bath 1. Since lead in the electrolytic solution supplied to the cathode chamber 13 has been removed in the tank 2 for solution purification, the entrainment of lead ions during deposition of electrodeposited tin is decreased. In addition, a liquid supply line 4a is connected to the anode chamber 15 of the electrolytic bath 1, and it is preferable to discharge the electrolytic solution in the anode chamber 15 (anolyte) containing lead leached from the raw material for tin constituting the anode 12. As described above, the electrolytic solution in the anode chamber 15 (anolyte) is discharged, and lead contained in the electrolytic solution is removed in the tank 2 for solution purification, and then the electrolytic solution in which lead has been removed is circulatedly supplied to the side of the cathode chamber 13, which results in recycling the electrolytic solution as the electrolytic solution in the cathode chamber 13 (catholyte). As a result, the frequency of supplementing a new electrolytic solution is decreased, and therefore, the electrolytic solution can be effectively utilized, and the production efficiency of high purity tin can be improved.

In addition, since the smoothing agent is added to the electrolytic solution which is supplied into the cathode chamber 13, the surface property of electrodeposited tin deposited on the surface of the cathode 11, which was conventionally needle-shaped, can be further smoothened, and therefore, plate-shaped electrodeposited tin can be obtained. As a result, compared to the case when conventional needle-shaped electrodeposited tin is utilized, the entrainment of the electrolytic solution within electrodeposited tin upon pulling up electrodeposited tin can be decreased, and less supplementation of the electrolytic solution is required. Further, the yield of casting when metallic tin is manufactured by subsequent melting casting can be increased, and furthermore, the content of sulfur which is the main component of the electrolytic solution can be prevented from contaminating electrodeposited tin, and therefore, the content of sulfur in electrodeposited tin can be decreased and the productivity of high purity tin can be improved. Metallic tin manufactured according to the present invention has a reduced concentration of sulfur, and therefore, when being used as a solder material, corrosion of electrode materials such as Cu and Al can be suppressed, and an increase in contact resistance between an electrode and a solder material can be suppressed.

Method for Manufacturing High Purity Tin

Next, a method for manufacturing high purity tin according to an embodiment of the present invention will be described. The method for manufacturing high purity tin according to this embodiment comprises: (a) a step of depositing electrodeposited tin on the surface of a cathode by electrowinning in an electrolytic bath in which a diaphragm is placed between an anode and the cathode, by using a raw material for tin as the anode and a leachate obtained by electrolytically leaching the raw material for tin in a sulfuric acid solution as an electrolytic solution (the electrowinning step); and (b) a step of melting casting electrodeposited tin (the melting casting step).

(a) The Electrowinning Step

In the electrowinning step, electrowinning of tin is performed by using an electrowinning apparatus shown in FIG. 1. As an electrolytic solution, a leachate obtained by electrolytically leaching a raw material for tin, preferably a raw material for tin with the purity of 4N or higher, in a sulfuric acid solution is used. As an anode, an anode made of tin obtained by casting a raw material for tin, preferably a raw material for tin with the purity of 4N or higher, is used, and as a cathode, a titanium plate is used, respectively. A concentration of tin in the electrolytic solution is preferably about 1 to about 100 g/L, more preferably about 30 to about 100 g/L, and pH of the electrolytic solution is preferably 0 to 1, and more preferably 0.3 to 0.8.

A current density during electrowinning is preferably 1 to 5 A/dm$^2$, and more preferably 2 to 3 A/dm$^2$. When the current density is too low, the productivity tends to be decreased, and when the current density is too high, the electrolytic voltage tends to be increased, which may result in deposition of needle-shaped tin due to an impaired effect of a smoothing agent. A temperature of the electrolytic solution during electrolysis is 10 to 40° C.

During electrowinning, at least a part of the electrolytic solution is discharged and is supplied to a tank 2 for solution purification. For example, when an anode 12 obtained by casting a raw material for tin with the purity of 4N or higher and with the content of lead of 20 ppm or less is used, leaching of lead is less than the case where an anode with a large amount of impurities is used, but lead accumulates in the electrolytic solution by performing electrowinning for a long time period.

In the tank 2 for solution purification, lead in the electrolytic solution is removed by conducting, on the discharged electrolytic solution, solvent extraction of lead ions by using an extracting agent, ion exchange by using an ion exchange resin and the like, salt precipitation of hardly soluble sulfide by adding sulfide, coprecipitation by adding a coprecipitating agent such as strontium ion, and the like. For example, strontium ion is added to the discharged electrolytic solution and the solution is stirred for 1 to 24 hours. As a source of strontium ion, strontium carbonate is suitable. In addition, an alkaline earth metal salt such as barium carbonate can be utilized. After stirring is complete, a precipitate is generated from lead and strontium sulphate in the electrolytic solution.

The electrolytic solution in the tank 2 for solution purification after the solution purification processing is subjected to solid-liquid separation in a filtration device 3 to remove impurities. For example, when coprecipitation processing of lead by using a coprecipitating agent is performed in the tank 2 for solution purification, a precipitate containing lead is generated in the electrolytic solution, and therefore, the electrolytic solution containing this precipitate is subjected to solid-liquid separation in the filtration device 3. The concentration of lead in the electrolytic solution according to this embodiment is decreased typically to 0.2 mg/L or less, and more typically to 0.1 mg/L or less, by performing solid-liquid separation.

The filtrate obtained after the solid-liquid separation is put back into a storage tank 5 as an electrolytic solution with high purity tin. In the storage tank 5, the electrolytic solution can be adjusted by further adding a smoothing agent and, if necessary, sulfuric acid, an additive, an antioxidant and the like to the electrolytic solution. The electrolytic solution in the storage tank 5 is supplied to a cathode chamber 13 of an electrolytic bath 1 through a liquid supply line 4*d*.

(b) The Melting Casting Step

After performing electrowinning, electrodeposited tin deposited on the surface of a cathode 11 is recovered by pulling it up from the electrolytic bath 1, and the electrodeposited tin after recovery is subjected to melting casting at 250 to 300° C. to manufacture purified metallic tin. In the electrodeposited tin after recovery, the formation of a large-sized, needle-shaped electrodeposited entity is suppressed compared to conventional electrodeposited tin. As a result, entrainment of a large amount of the electrolytic solution in the electrodeposited entity can be suppressed upon recovery of the cathode 11 by pulling it up from the electrolytic bath 1. In addition, tin according to this embodiment has a surface of electrodeposited tin which is smoother than that of the conventional electrodeposited tin, and therefore, the surface area of electrodeposited tin is decreased, which makes reduction casting in a hydrogen atmosphere unnecessary and makes it possible to perform melting casting in the air. Accordingly, the production cost for melting casting can be lowered, and the productivity of tin can be improved.

Metallic Tin

High purity tin (purified metallic tin) obtained by the above-described method for manufacturing high purity tin according to an embodiment of the present invention has the content of lead of less than 0.1 ppm, the content of sulfur of 1.0 ppm or less, the content of copper of less than 0.1 ppm, the content of antimony of less than 0.5 ppm and the α ray count of 0.001 cph/cm$^2$ or less, as evaluated by Glow Discharge Mass Spectrometry (GDMS). Meanwhile, the representation of the unit "ppm" used in the present invention means "ppm by weight (wt. ppm)". An α ray count of metallic tin indicates a dose of α rays as measured by using Gas Flow Proportional Counter Model 8600A-LB manufactured by ORDELA INC. When using this apparatus, the gas used was 90% argon/10% methane, and the measurement time for both background and samples was 104 hours. In the measurement time, the first four hours was the time required for purging a test chamber, and the subsequent period of time from 5 to 104 hours was the time required for data measurement. Since a trace amount of α rays (background (BG) α rays) are emitted from the measurement apparatus, the value obtained by subtracting the background α ray count from the measurement data of the α ray count was evaluated as the α ray count of metallic tin. The α ray count of metallic tin means a result measured within three months from electrowinning.

The purity of high purity tin according to the embodiment of the present invention is 4N or higher (provided that the purity excludes the gas components of O, C, N and H). More typically, high purity tin having the purity of 5N or higher can be obtained. The measurement values of the contents of impurity elements in high purity tin mean values of results obtained by conducting analysis by the GDMS method which sets Sn as a matrix and sets Li, Be, B, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Ru, Rh, Pd, Ag, Cd, In, Sb, Te, I, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, Bi, Th and U as subjects. Meanwhile, a raw material for tin and Comparative Example 1 show results of 73 elemental components in total measured by the GDMS method.

High purity tin according to this embodiment has, as a result of mass spectrometry, the content of each of Li, Be, B, F, Na, Mg, Al, Si, Cl, K, Ca, Sc, Ti, V, Cr, Mn, Co, Ni, Zn, Ga, Ge, As, Se, Br, Rb, Sr, Y, Zr, Nb, Mo, Ru, Rh, Pd, Ag, Cd, In, Te, I, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Th and U of less than the detection limit value, respectively.

In the present invention, the phrase "less than the detection limit value" means, Sc and V of less than 0.001 ppm, Li, Be, B, Ti, Cr, Mn, Ga, Rb, Sr, Y, Zr, Nb, Rh, Pd, Ba, La, Ce, Pr, Nd, Sm, Gd, Tb, Dy, Ho, Er, Tm, Yb, Lu, Th and U of less than 0.005 ppm, Na, Mg, Al, Si, P, Cl, K, Ca, Co, Ni, Zn, Ge, Se, Mo, Ru, Eu, Hf, W, Re, Os, Ir, Pt and Bi of less than 0.01 ppm, Tl of less than 0.02 ppm, F, Br, Cd, I, Cs, Au and Hg of less than 0.05 ppm, Te of less than 0.1 ppm, In of less than 1 ppm, and Ta of less than 5 ppm.

Tin according to the embodiment of the present invention is high purity tin with low emission of α rays, and with low contents of impurities, in particular, with the low content of lead.

EXAMPLES

Though both Examples and Comparative Examples of the present invention are described hereinbelow, these Examples are provided such that the present invention and advantages thereof are well understood but are not provided with intention of limiting the scope of the present invention.

Example 1

A predetermined amount of a sulfuric acid solution was added to a cathode side and a dilute sulfuric acid solution of pH 0.5 was added to an anode side of an electrolytic bath of which a cathode and an anode were partitioned by an anion exchange membrane (SELEMION AMV manufactured by ASAHI GLASS CO., LTD.). In addition, hydroquinone was added as an antioxidant into an anode side electrolytic solution such that the concentration was 5 g/L in the electrolytic solution. An anode obtained by casting a raw material for tin and a cathode made of titanium were placed in the electrolytic bath, respectively, and electrolytically leaching was performed at a current density of 2 A/dm$^2$ and a solution temperature of 33° C. to give an electrolytic solution of tin sulfate (with a concentration of tin of 105 g/L).

A result of analysis of the raw material for tin (raw material) used as the anode is shown in FIG. 2.

A portion of the electrolytic solution in the anode chamber was discharged, and was supplied to a tank for solution purification in which lead is removed. Slurried strontium carbonate which had been dispersed into pure water was added to the tank for solution purification such that the concentration of strontium carbonate was 5 g/L in the electrolytic solution, and the resulting solution was stirred for 16 hours. After stirring, the electrolytic solution was subjected to solid-liquid separation by sucking filtration in order to remove lead in the electrolytic solution. Then, the electrolytic solution from which lead had been removed was added into the cathode side chamber. The electrolytic solution from which lead had been removed had the concentration of lead of less than 0.1 mg/L.

A dilute sulfuric acid solution of pH 0.5 was added to the anode side of the electrolytic bath such that the reduced amount corresponding to the discharged electrolytic solution was supplemented. In addition, 5 g/L of hydroquinone was added as an antioxidant to the anode side of the electrolytic bath.

Polyoxyethylene (10) nonyl phenyl ether as a smoothing agent was added to the cathode side electrolytic solution which had undergone the solution purification processing such that the concentration of polyoxyethylene (10) nonyl phenyl ether was 5 g/L. In this state, electrowinning at a current density of 2 A/dm$^2$, at pH 0.5 and at a solution temperature of 30° C. was performed until the concentration of tin in the cathode side electrolytic solution became 48 g/L, and then, the cathode was pulled up from the electrolytic bath. Electrodeposited tin with a smooth surface property composed of a plate crystal without needle-shaped growth was obtained on the cathode. Meanwhile, the smoothing agent added to the cathode chamber could not enter the anode side by passing through the anion exchange membrane in the electrolytic bath.

Electrodeposited tin deposited on the cathode was detached, and was heated to 250 to 300° C. in the air to perform melting casting, which gave purified metallic tin. As a result of analysis of the thus obtained purified metallic tin, the content of lead was less than 0.01 ppm. In addition, the content of antimony was less than 0.5 ppm, the content of copper was 0.06 ppm, and the content of sulfur was 0.12 ppm. The α ray count of the obtained purified metallic tin was 0.001 cph/cm$^2$ or less. The results of measurements of impurities in purified metallic tin measured by the GDMS method are shown in FIG. 2.

Example 2

In Example 1, the concentration of tin in the electrolytic solution in the anode chamber after completing electrowinning was 94 g/L and pH of this solution was pH 0.54. This electrolytic solution in the anode chamber was discharged, and was supplied to the tank for solution purification in which lead is removed. Powdery strontium carbonate was added to the tank for solution purification such that the concentration of strontium carbonate was 5 g/L in the electrolytic solution, and the resulting solution was stirred for 16 hours. After stirring, the electrolytic solution was subjected to solid-liquid separation by sucking filtration in order to remove lead as a precipitate in the electrolytic solution.

Next, a post treatment solution containing the smoothing agent which had been obtained in the cathode chamber by electrowinning of Example 1 was added back to the anode side of the electrolytic bath such that the reduced amount corresponding to the discharged electrolytic solution was supplemented.

Then, the electrolytic solution from which lead had been removed in the tank for solution purification was added into the cathode side chamber. The electrolytic solution from which lead had been removed had the concentration of lead of less than 0.1 mg/L. In a similar manner to Example 1, polyoxyethylene (10) nonyl phenyl ether as a smoothing agent was added to the cathode side electrolytic solution which had undergone the solution purification processing such that the concentration of polyoxyethylene (10) nonyl phenyl ether was 5 g/L. In this state, electrowinning at a current density of 1.3 A/dm$^2$, and at a solution temperature of 24° C. was performed until the concentration of tin became 37 g/L, and then, the cathode was pulled up from the electrolytic bath. As a result, similar to Example 1, electrodeposited tin composed of a plate crystal was obtained on the cathode. Further, in a similar manner to Example 1, casting was performed to give purified metallic tin. As a result of analysis of the thus obtained purified metallic tin, the content of lead was less than 0.01 ppm. In addition, the content of antimony was less than 0.5 ppm, the content of copper was less than 0.01 ppm, and the content of sulfur was 0.38 ppm. The ac ray count of the obtained purified metallic tin was 0.001 cph/cm$^2$ or less. The results of measurements of impurities in the purified metallic tin measured by the GDMS method are shown in FIG. 2.

Example 3

In Example 2, the concentration of tin in the electrolytic solution in the anode chamber was 100 g/L and pH of this solution was pH 0.63 after completing electrowinning. The solution purification processing was performed in a similar manner to Example 2 except that the added amount of strontium carbonate was 10 g/L. The electrolytic solution from which lead had been removed had the concentration of lead of less than 0.1 mg/L.

Next, a post treatment solution containing the smoothing agent which had been obtained in the cathode chamber by electrowinning of Example 2 was added back to the anode side of the electrolytic bath such that the reduced amount corresponding to the discharged electrolytic solution was supplemented.

Then, the electrolytic solution from which lead had been removed in the tank for solution purification was added into the cathode side chamber. The smoothing agent added in Example 1 was not decomposed in the cathode chamber in the electrolytic bath and was still contained in the electrolytic solution in the cathode chamber, and therefore, no smoothing agent was supplemented further. In this state, electrowinning at a current density of 1.3 A/dm$^2$, and at a solution temperature of 26° C. was performed until the concentration of tin became 43 g/L, and then, the cathode was pulled up from the electrolytic bath. As a result, similar to Example 1, electrodeposited tin composed of a plate crystal was obtained on the cathode. Further, in a similar manner to Examples 1 and 2, casting was performed to give purified metallic tin. As a result of analysis of the thus obtained purified metallic tin, the content of lead was less than 0.01 ppm. In addition, the content of antimony was less than 0.5 ppm, the content of copper was 0.02 ppm, and the content of sulfur was 0.28 ppm. The at ray count of the obtained purified metallic tin was 0.001 cph/cm$^2$ or less. The results of measurements of impurities in purified metallic tin measured by the GDMS method are shown in FIG. 2.

Example 4

In a similar manner to Example 1, a predetermined amount of a sulfuric acid solution was added to a cathode side and a dilute sulfuric acid solution of pH 0.5 was added to an anode side of an electrolytic bath of which a cathode and an anode were partitioned by an anion exchange membrane (SELEMION AMV manufactured by ASAHI GLASS CO., LTD.). In addition, 5 g/L of hydroquinone as an antioxidant and 5 g/L of β-naphthol as a smoothing agent were added into an anode side electrolytic solution.

An anode obtained by casting a raw material for tin and a cathode made of titanium were placed in the electrolytic bath, respectively, and electrolytically leaching was performed at a current density of 2 A/dm$^2$ and a solution temperature of 33° C. to give an electrolytic solution of tin sulfate (with a concentration of tin of 105 g/L).

Next, a portion of the electrolytic solution in the anode chamber was discharged, and was supplied to a tank for solution purification in which lead is removed. Slurried strontium carbonate which had been dispersed into pure water was added to the tank for solution purification such that the concentration of strontium carbonate was 5 g/L in the electrolytic solution, and the resulting solution was stirred for 16 hours. After stirring, the electrolytic solution was subjected to solid-liquid separation by sucking filtration in order to remove lead in the electrolytic solution. Then, the electrolytic solution from which lead had been removed was added into the cathode side chamber. The electrolytic solution from which lead had been removed had the concentration of lead of less than 0.1 mg/L. Further, the dilute sulfuric acid solution of pH 0.5 was added to the anode side of the electrolytic solution such that the reduced amount corresponding to the discharged electrolytic solution was supplemented. In addition, 5 g/L of hydroquinone was added as an antioxidant to the anode side.

In Example 4, since β-naphthol had been added beforehand as a smoothing agent to the electrolytically leaching solution in the anode chamber, further supplementation of the smoothing agent to the electrolytic solution in the cathode chamber was not required. In this state, electrowinning at a current density of 1.3 A/dm$^2$ and at a solution temperature of 32° C. was performed until the concentration of tin became 31 g/L, and then, the cathode was pulled up from the electrolytic bath. Similar to Examples 1 to 3, electrodeposited tin composed of a plate crystal was obtained on the cathode. Furthermore, casting was performed in a similar manner to Examples 1 to 3 to give purified metallic tin. As a result of analysis of the thus obtained purified metallic tin, the content of lead was less than 0.01 ppm. In addition, the content of antimony was less than 0.5 ppm, the content of copper was less than 0.01 ppm, and the content of sulfur was 0.17 ppm. The α ray count of the obtained purified metallic tin was 0.001 cph/cm$^2$ or less. The results of measurements of impurities in purified metallic tin measured by the GDMS method are shown in FIG. 2.

Example 5

In a similar manner to Example 1, a predetermined amount of a sulfuric acid solution was added to a cathode side and a dilute sulfuric acid solution of pH 0.5 was added to an anode side of an electrolytic bath of which a cathode and an anode were partitioned by an anion exchange membrane (SELEMION AMV manufactured by ASAHI GLASS CO., LTD.). In addition, 5 g/L of hydroquinone as an antioxidant was added into an anode side electrolytic solution. An anode obtained by casting a raw material for tin and a cathode made of titanium were placed in the electrolytic bath, respectively, and electrolytically leaching was performed at a current density of 2 A/dm$^2$ and a solution temperature of 33° C. to give an electrolytic solution of tin sulfate (with a concentration of tin of 105 g/L).

Next, a portion of the electrolytic solution in the anode chamber was discharged, and was supplied to a tank for solution purification in which lead is removed. 10 g/L of an EO adduct of α-naphthol as a smoothing agent and slurried strontium carbonate which had been dispersed into pure water were added to the tank for solution purification such that the concentration of strontium carbonate was 5 g/L in the electrolytic solution, and the resulting solution was stirred for 16 hours. After stirring, the electrolytic solution was subjected to solid-liquid separation by sucking filtration in order to remove lead in the electrolytic solution. Then, the electrolytic solution from which lead had been removed was added into the cathode side chamber. The electrolytic solution from which lead had been removed had the concentration of lead of less than 0.1 mg/L.

The dilute sulfuric acid solution of pH 0.5 was added to the anode side of the electrolytic solution such that the reduced amount corresponding to the discharged electrolytic solution was supplemented. In addition, 5 g/L of hydroquinone was added as an antioxidant to the anode side.

Next, electrowinning at a current density of 1.3 A/dm$^2$ and at a solution temperature of 34° C. was performed until the concentration of tin became 35 g/L, and then, the cathode was pulled up from the electrolytic bath. Similar to Examples 1 to 4, electrodeposited tin composed of a plate crystal was obtained on the cathode. Furthermore, casting was performed in a similar manner to Examples 1 to 4 to give purified metallic tin. As a result of analysis of the thus obtained purified metallic tin, the content of lead was less than 0.01 ppm. In addition, the content of antimony was less than 0.5 ppm, the content of copper was 0.05 ppm, and the content of sulfur was 0.2 ppm. The α ray count of the obtained purified metallic tin was 0.001 cph/cm² or less. The results of measurements of impurities in purified metallic tin measured by the GDMS method are shown in FIG. 2.

Comparative Example 1

In Example 4, the concentration of tin in the electrolytic solution in the anode chamber generated during electrolysis for obtaining electrodeposited tin was 73 g/L and its pH was pH 0.6. Without performing the solution purification processing, this electrolytic solution was moved to the cathode chamber as a cathode side electrolytic solution. Then, without adding a smoothing agent, electrowinning was performed at a current density of 2.0 A/dm², and at a solution temperature of 34° C., until the concentration of tin became 37 g/L. Thereafter, the cathode was pulled up from the electrolytic bath. Metallic tin electrodeposited on a cathode plate had undergone needle-shaped growth. When pulling up the cathode plate from the electrolytic bath, the cathode plate was pulled up while entraining a large amount of the electrolytic solution. Thereafter, casting was performed in a similar manner to Examples 1 to 5 to give purified metallic tin. As a result of analysis of the thus obtained purified metallic tin, the content of lead was 1.5 ppm. In addition, the content of antimony was less than 0.5 ppm, the content of copper was 0.1 ppm, and the content of sulfur was 1.5 ppm. The α ray count of the obtained purified metallic tin was 0.0014 cph/cm². The results of measurements of impurities in purified metallic tin measured by the GDMS method are shown in FIG. 2.

Figures 3, 4:
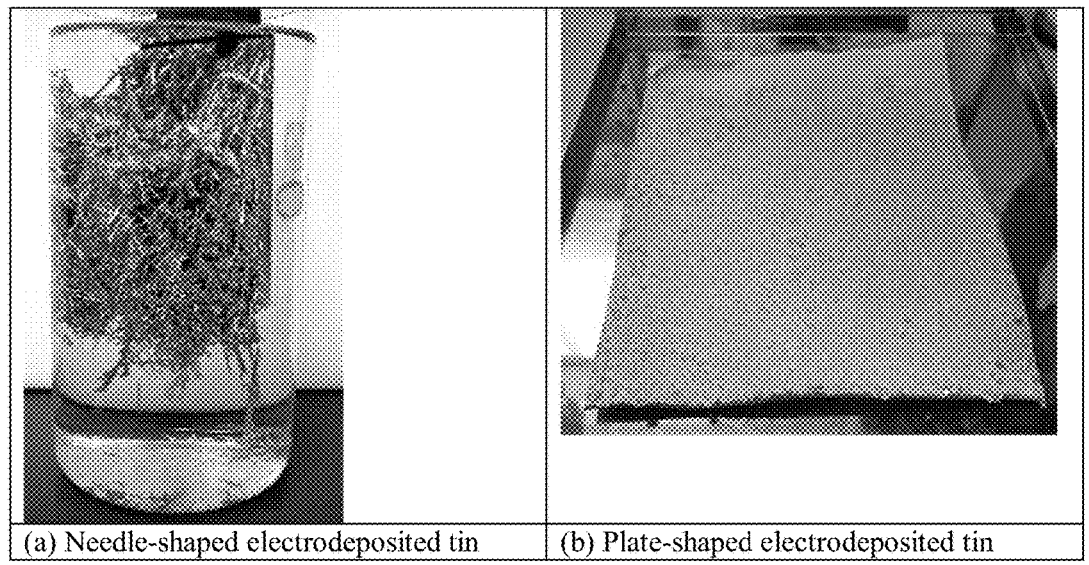
FIG. 3: A table which shows comparison of the contents of main impurities in high purity tin manufactured by a conventional manufacturing method which does not employ a smoothing agent or a diaphragm (Comparative Examples 2 to 4) and those in high purity tin of Examples 1 to 5.
FIG. 4: Examples of the appearance of electrodeposited tin composed of a needle-shaped crystal and that of electrodeposited tin composed of a plate crystal.

Results of the Comparison of Appearances and Casting Yields of Electrodeposited Tin Photographs of the appearances of electrodeposited tin obtained without using a smoothing agent as disclosed in JP 5296269 B1 (corresponding to EP 1900853 A1) and electrodeposited tin obtained in Examples 1 to 5 were evaluated. As a result, in the case of electrodeposited tin generated as disclosed in JP 5296269 B1, needle-shaped electrodeposited tin (electrodeposited tin composed of a needle-shaped crystal) was formed on the whole surface of the cathode 11. Accordingly, when detaching electrodeposited tin from the cathode 11, falling of electrodeposited tin into the electrolytic bath occurred, which lead to the loss of electrodeposited tin, hence the yield of electrolysis was only 90%. In addition, as casting yields, the electrolysis yields of all of Examples 1 to 5 were 97%, and casting yields of all of Examples 1 to 5 were around 97%. In contrast, with regard to electrodeposited tin generated as disclosed in JP 5296269 B1, a casting yield of only around 82% could be achieved. FIG. 4 shows examples of the appearances of electrodeposited tin composed of a needle-shaped crystal generated as disclosed in JP 5296269 B1 (FIG. 4*a*) and of electrodeposited tin composed of a plate crystal generated according to the present invention (FIG. 4*b*).

Influences of the Presence or Absence of a Diaphragm and a Smoothing Agent on the Impurities-Removing Effect The contents of main impurities (S, Cu, Sb, Pb) in purified metallic tin obtained by melting casting of electrodeposited tin obtained by electrolytic refining without adding a smoothing agent and without using a diaphragm according to the method disclosed in JP 5296269 B1 (Comparative Examples 2 to 4) and the contents of main impurities in Examples 1 to 5 were evaluated by the GDMS method. The results of comparisons are shown in FIG. 3.

Though the measurement results of the α ray count of all the Comparative Examples 2 to 4 were 0.001 cph/cm² or less, from the results shown in FIG. 3, when the diaphragm which was an ion exchange membrane was not placed between the cathode and the anode in electrolytic refining, and a smoothing agent was not used either, lead could be refined to some degree because the potential difference between tin and lead could be maintained. However, in Comparative Examples 2 to 4, the content of lead in tin could not be reduced to less than 0.1 ppm, and the content of sulfur could not be reduced to less than 1 ppm as in Examples 1 to 5. In addition, needle-shaped electrodeposited metal was generated in Comparative Examples 2 to 4, and when recovering this electrodeposited needle-shaped metal, a large amount of the electrolytic solution was entrained.

The invention claimed is:

1. A method for manufacturing high purity tin having a purity of 5N or higher, the method comprising:
   electrodepositing tin on a surface of a cathode by electrowinning in an electrolytic bath in which a diaphragm is placed between an anode and the cathode, by using a raw material for tin as the anode and a leachate obtained by electrolytically leaching the raw material for tin in a sulfuric acid solution as an electrolytic solution, wherein the electrolytic solution contains a smoothing agent,
   discharging the electrolytic solution from the electrolytic bath, removing lead from the discharged electrolytic solution by a coprecipitation of adding coprecipitating agent containing strontium ion, and then performing a solid-liquid separation of the discharged electrolytic solution from which the lead is removed, and
   putting the electrolytic solution from which lead is removed back into the electrolytic bath.

2. The method for manufacturing high purity tin according to claim 1, which comprises:
   discharging the electrolytic solution into an anode side chamber in the electrolytic bath in which the anode is placed,
   removing lead from the discharged electrolytic solution, and
   putting the electrolytic solution from which lead is removed back into a cathode side chamber in the electrolytic bath in which the cathode is placed.

3. The method for manufacturing high purity tin according to claim 1, wherein the smoothing agent comprises a nonionic surfactant which is a compound having an aryl group with one or more hydroxyl groups, the one or more hydroxyl groups being connected to the aryl group via methylene or a plurality of ethylene oxides.

4. The method for manufacturing high purity tin according to claim 1, wherein the smoothing agent comprises a polyoxyethylene alkyl phenyl ether.

5. The method for manufacturing high purity tin according to claim 1, which employs the raw material for tin with a purity of 4N (99.99%) or higher, the purity excluding the gas components of O, C, N and H.

6. The method for manufacturing high purity tin according to claim 1, wherein the content of lead in the raw material for tin is 20 ppm or less.

7. The method for manufacturing high purity tin according to claim 1, wherein an electrodeposited tin of high purity composed of a plate crystal is obtained.

8. The method for manufacturing high purity tin according to claim 1, wherein 1 to 30 g/L of the coprecipitating agent is added.

9. The method for manufacturing high purity tin according to claim 1, wherein the coprecipitation agent comprises strontium carbonate.

10. The method for manufacturing high purity tin according to claim 1, the electrolytic solution contains 1 to 20 g/L of the smoothing agent.

* * * * *